(12) United States Patent
Alm

(10) Patent No.: US 10,495,053 B2
(45) Date of Patent: Dec. 3, 2019

(54) WAVE ENERGY CONVERTER WITH A DIFFERENTIAL CYLINDER

(71) Applicant: W4P WAVES4POWER AB, Vastra Frolunda (SE)

(72) Inventor: Filip Alm, Bohus (SE)

(73) Assignee: W4P Waves4Power AB, Västra Frölunda (SE)

( * ) Notice: Subject to any disclaimer, the term of this patent is extended or adjusted under 35 U.S.C. 154(b) by 211 days.

(21) Appl. No.: 15/574,186

(22) PCT Filed: May 31, 2016

(86) PCT No.: PCT/SE2016/000028
§ 371 (c)(1),
(2) Date: Nov. 15, 2017

(87) PCT Pub. No.: WO2016/200306
PCT Pub. Date: Dec. 15, 2016

(65) Prior Publication Data
US 2018/0135591 A1 May 17, 2018

(30) Foreign Application Priority Data
Jun. 8, 2015 (SE) ...................................... 1530082

(51) Int. Cl.
*F03B 13/18* (2006.01)
*F04B 35/00* (2006.01)
(Continued)

(52) U.S. Cl.
CPC ............ *F03B 13/1875* (2013.01); *F04B 9/10* (2013.01); *F04B 17/00* (2013.01); *F04B 35/00* (2013.01);
(Continued)

(58) Field of Classification Search
CPC ......... B63B 35/4406; B63B 2035/4466; F03B 13/187; F03B 13/20; Y02E 10/38
See application file for complete search history.

(56) References Cited

U.S. PATENT DOCUMENTS 4,076,463 A * 2/1978 Welczer ................ F03B 13/187
417/331
4,277,690 A 7/1981 Noren
(Continued)

FOREIGN PATENT DOCUMENTS

GB 1 587 433 A 4/1981
WO 9922137 A1 5/1999

OTHER PUBLICATIONS

International Search Report, dated Sep. 5, 2016, from corresponding PCT/SE2016/000028 application.

*Primary Examiner* — Patrick Hamo
(74) *Attorney, Agent, or Firm* — Young & Thompson

(57) ABSTRACT

A wave energy converter includes a buoyant body and an acceleration tube with a working cylinder and working piston movable therein, a mooring system, and at least one energy collecting device including a differential cylinder having an internal pump piston connected to the working piston via a piston rod. The differential cylinder includes a pumping chamber and an annular pumping chamber. When decreasing volume of the annular gap-shaped pumping chamber, the pump piston expels hydraulic fluid from the pumping chamber toward the pressure accumulator and draws hydraulic fluid from the fluid tank into the substantially cylindrical pumping chamber. During a working stroke causing a decrease in volume of the substantially cylindrical pumping chamber, the pump piston causes hydraulic fluid to bypass the pump piston through a fluid connection from the substantially cylindrical pumping chamber into the annular
(Continued)

gap-shaped pumping chamber and further in a direction toward the pressure accumulator.

20 Claims, 3 Drawing Sheets

(51) Int. Cl.
    *F04B 9/10*     (2006.01)
    *F04B 17/00*     (2006.01)
    *F04B 53/12*     (2006.01)
    *F04B 53/14*     (2006.01)

(52) U.S. Cl.
    CPC .......... *F04B 53/125* (2013.01); *F04B 53/144* (2013.01); *F05B 2260/406* (2013.01); *Y02E 10/38* (2013.01)

(56) References Cited

U.S. PATENT DOCUMENTS

| | | | | |
|---|---|---|---|---|
| 4,326,840 A | * | 4/1982 | Hicks | B01D 61/10 417/331 |
| 4,698,969 A | * | 10/1987 | Raichlen | F03B 13/187 210/121 |
| 4,773,221 A | * | 9/1988 | Noren | F03B 13/187 60/497 |
| 6,140,712 A | * | 10/2000 | Fredriksson | F03B 13/1855 290/53 |
| 6,226,989 B1 | * | 5/2001 | Fredriksson | F03B 13/1855 60/501 |
| 6,731,019 B2 | * | 5/2004 | Burns | F03B 13/148 290/42 |
| 6,768,216 B1 | * | 7/2004 | Carroll | F03B 13/148 290/42 |
| 7,076,949 B2 | * | 7/2006 | Fernandez Gomez | F03B 13/1855 60/498 |
| 7,909,536 B2 | * | 3/2011 | Dick | B63B 35/44 405/76 |
| 10,328,996 B2 | * | 6/2019 | Alm | B63B 21/502 |
| 2008/0012344 A1 | * | 1/2008 | Buffard | F03B 13/187 290/53 |
| 2009/0250934 A1 | * | 10/2009 | Bozano | F03B 13/145 290/53 |

* cited by examiner

WAVE ENERGY CONVERTER WITH A DIFFERENTIAL CYLINDER

TECHNICAL FIELD

The present invention relates to a wave energy converter comprising a buoyant body, an acceleration tube dependent from and attached to the buoyant body and defining a working cylinder between an upper and a lower end thereof, upper and lower openings in the acceleration tube, a working piston reciprocable in the working cylinder, a mooring system adapted to maintain the wave energy converter within a desired anchoring area, and an energy conversion assembly comprising at least one energy collecting device collecting energy from the movements of the working piston relative to the buoyant body resulting from wave movements.

BACKGROUND OF THE INVENTION

Wave movements in oceans and large lakes constitute an important source of energy which can be utilized by harvesting energy from the waves by means of wave power assemblies, also called wave energy converters, which are positioned or anchored at locations with suitable wave conditions.

A number of different types of wave energy converters for harvesting and converting wave energy into electrical power are previously known. One previously known type of wave energy converter is based on relative movement between, on the one hand, a buoyant body and a thereto attached so-called acceleration tube, and, on the other hand, a working piston reciprocable in the acceleration tube, wherein the relative movement is caused by wave movements in the body of water where the wave energy converter is anchored by means of one or several mooring lines for harvesting wave energy. The movement of the working piston can be used for driving, for example, a pump assembly, such as a double acting hydraulic pump or a hose pump, a hydraulic motor and/or a hydraulic turbine of an energy conversion system, which is disposed inside or adjacent to the buoyant body for producing electricity which can be transferred to an energy storage or electrical grid.

A disadvantage of the previously known wave energy converters with acceleration tubes and energy collecting devices in the form of hydraulic piston pumps is that the previously utilized pumps are usually designed as a cylinder with a through-going piston rod and require a large length of stroke to enable a sufficiently high pumping flow rate to be achieved, resulting in that the energy conversion assembly as a whole will require a large space. This usually results in a large weight of the wave energy converter and in that components of the energy conversion assembly will extend far beyond the side and/or above the buoyant body of the wave energy converter and thereby result in an undesirably large area exposed to the wind and an unfavourable weight distribution with a considerable part of the weight high up and/or beyond the outer contour of the buoyant body. The high weight may make placement and also maintenance of such a wave energy converter difficult, and the large area exposed to the wind and the unfavourable weight distribution can increase the risk of operational problems or breakdowns in strong winds.

Additional problems solved by the present invention will become evident from the following description.

SUMMARY OF THE INVENTION

A first object of the present invention is therefore to provide a wave energy converter having an acceleration tube and an improved energy conversion assembly which, as compared to the previously utilized assemblies, has a lower total weight and a better weight distribution and requires a smaller space, and which thereby allows a smaller area exposed to the wind outside the actual buoyant body, whereby both placement and maintenance of the wave energy converter are facilitated and the risk of operational problems or breakdowns in strong winds is reduced.

This first object is achieved by means of a wave energy converter according to claim 1, which comprises a buoyant body, an acceleration tube dependent from and attached to the buoyant body and having an upper end adjacent to the buoyant body and a lower end at a distance from the buoyant body, wherein a portion of the acceleration tube defines a working cylinder between the upper end and the lower end, upper and lower openings in the acceleration tube for allowing a substantially unimpeded flow of water between the working cylinder and a body of water in which the acceleration tube is at least partially submerged when the wave energy converter operates as a result of wave movements, a working piston reciprocable in the working cylinder, a mooring system adapted to maintain the wave energy converter within a desired anchoring area and comprising at least one fastening device mounted on the buoyant body for attachment of a mooring line to the buoyant body, and an energy conversion assembly comprising at least one energy collecting device collecting energy from the movements of the working piston relative to the buoyant body resulting from said wave movements, wherein the energy collecting device includes a hydraulic piston pump in the form of a differential cylinder having an internal pump piston, which is connected to the working piston in the acceleration tube via a piston rod, wherein the differential cylinder comprises a substantially cylindrical pumping chamber on one side of the pump piston and an annular gap-shaped pumping chamber around the piston rod on the other side of the pump piston, wherein the annular gap-shaped pumping chamber is adapted to be connectable, via hydraulic fluid conduits, to a hydraulic pressure accumulator, and to then be further connectable, via hydraulic fluid conduits, to a hydraulic motor in driving connection with a generator during operation of the wave energy converter, wherein a fluid connection provided with a one-way valve is arranged for connection between the cylinder chambers on each side of the pump piston, from the substantially cylindrical pumping chamber to the annular gap-shaped pumping chamber, wherein a fluid conduit provided with a one-way valve is arranged from a fluid tank to the substantially cylindrical pumping chamber, so that, during operation of the wave energy converter, the pump piston will expel hydraulic fluid from the annular gap-shaped pumping chamber into the fluid conduits in a direction toward the pressure accumulator and simultaneously draw hydraulic fluid, via the fluid conduit from the fluid tank, into the substantially cylindrical pumping chamber, during a working stroke causing a decrease in volume of the annular gap-shaped pumping chamber, and so that the pump piston, during a working stroke causing a decrease in volume of the substantially cylindrical pumping chamber, will cause hydraulic fluid to bypass the pump piston, through the fluid connection provided with the one-way valve, from the substantially cylindrical pumping chamber into the annular gap-shaped pumping chamber and further in a direction toward the pressure accumulator via the fluid conduits.

Thanks to the fact that the energy collecting device of the wave energy converter according to the invention comprises a hydraulic piston pump in the form of a differential cylinder in accordance with the foregoing, which lacks a through-going piston rod and whose two working strokes can generate a sufficient hydraulic flow regardless of whether the buoyant body of the wave energy converter moves up or down, the maximum external dimension and also the weight of the energy collecting device can, in principle, be halved without losing power, as compared with the energy collecting devices of the previously known wave energy converters with acceleration tubes. The low weight and the small external dimensions of the differential cylinder allows the cylinder, and also other components of the energy conversion assembly, to be positioned in a manner that requires only small space and that does not create any unnecessary area exposed to the wind or any unfavourable weight distribution which may disturb the operation of the wave energy converter.

A second object of the present invention is to provide a wave energy converter having an acceleration tube and an energy collecting device including a differential cylinder with a simple, material-saving and operationally reliable design with low weight, which contributes to further reducing the total weight of the energy conversion assembly.

This second object is achieved by means of a wave energy converter according to claim 2, in which the one-way valve of the fluid connection bypassing the pump piston of the differential cylinder is arranged in the pump piston itself.

By arranging the fluid connection, provided with a one-way valve and bypassing the pump piston of the differential cylinder, in the pump piston itself, the need for external fluid conduits bypassing the pump piston is eliminated and the total weight of the energy conversion assembly can be reduced further, as compared with the previously known wave energy converters.

A third object of the present invention is to provide a wave energy converter having an acceleration tube which comprises an energy conversion assembly with a design that facilitates maintenance of the energy collecting device and other components thereof.

This third object is achieved by means of a wave energy converter according to claim 3, in which the hydraulic fluid conduits connecting the annular gap-shaped pumping chamber to the pressure accumulator are provided with at least one stop valve.

The provision of such a stop valve makes it possible to operate the pump piston of the differential cylinder to a desired position in the pumping chambers and to fix the pump piston in this position by operating the stop valve, which can facilitate maintenance and service of components of the differential cylinder, and also of other components of the energy conversion assembly.

A fourth object of the present invention is to provide a wave energy converter having an acceleration tube and an energy conversion assembly with a design that minimizes the risk of damages due to excessively high rotational speeds of the hydraulic motor and/or generator.

This fourth object is achieved by means of a wave energy converter according to claim 4, in which the hydraulic fluid conduits connecting the hydraulic motor to the pressure accumulator and to the annular gap-shaped pumping chamber, respectively, are provided with at least one speed limiting valve, which minimizes the risk of dangerously high rotational speeds of the motor and/or generator occurring in that the valve is adapted to close the direct fluid connection to the hydraulic motor when detecting a risk of excessively high rotational speeds and to thereby bypass the hydraulic fluid to the hydraulic motor through a constriction disposed in the hydraulic fluid conduits.

Thanks to such a speed limiting valve, which closes the direct fluid connection to the hydraulic motor when detecting a risk of excessively high rotational speeds and bypasses the hydraulic fluid through a pressure reducing means in the form of a constriction, the risk of excessively high rotational speeds of the hydraulic motor and/or generator is minimized.

A fifth object of the present invention is to provide a wave energy converter having an acceleration tube and an energy conversion assembly with a design that minimizes the risk of damages to the hydraulic motor in case of temporarily insufficient supply of hydraulic fluid from the differential cylinder and the pressure accumulator.

This fifth object is achieved by means of a wave energy converter according to claim 5, in which a fluid conduit provided with a one-way valve is arranged between the fluid tank and the fluid conduit upstream of the hydraulic motor.

The provision of such a fluid conduit with a one-way valve between the fluid tank and the fluid conduit upstream of the hydraulic motor allows the hydraulic motor, while it is still free-spinning at a high rotational speed as a result of a preceding wave movement, to draw hydraulic flow directly from the fluid tank if the supply of hydraulic fluid from the differential cylinder and the pressure accumulator becomes insufficient temporarily.

A sixth object of the present invention is to provide a wave energy converter having an acceleration tube and an energy conversion assembly with a design that minimizes the risk of damages due to excessively high hydraulic pressures in the system.

This sixth object is achieved by means of a wave energy converter according to claim 6, in which fluid conduits, provided with a safety valve actuated by excessive pressure in the hydraulic fluid, are arranged so as to provide a connection between the fluid conduits running in a direction toward the pressure accumulator and the fluid tank when the safety valve is actuated, for relieving the excessive pressure.

The provision of such a safety valve which, when detecting an excessively high pressure, is actuated and releases hydraulic fluid to the fluid tank, minimizes the risk of damages to components in the system due to excessively high pressures caused, for example, by an unusually big wave passing the buoyant body of the wave energy converter.

A seventh object of the present invention is to provide a wave energy converter having an acceleration tube and an energy collecting device with a design that allows the material consumption and the space requirement of the energy collecting device and the total weight of the energy conversion assembly to be further reduced as compared with the previously known wave energy converters.

This seventh object is achieved by means of a wave energy converter according to claim 7, in which a portion of the fluid conduit connecting the fluid tank to the substantially cylindrical pumping chamber is constituted by a hollow jacket of the differential cylinder.

By providing a hollow jacket of the differential cylinder serving as a portion of the fluid conduit between the fluid tank and the substantially cylindrical pumping chamber, the hydraulic conduits or pipes can be made shorter, and thereby lighter, without having to increase the weight of the differential cylinder. All in all, this reduces the weight, the material consumption and the space requirement of the energy collecting device and thus also the space requirement and the total weight of the entire energy conversion assembly.

An eighth object of the present invention is to provide a wave energy converter having an acceleration tube and an energy collecting device with a design that allows a substantially equal flow of hydraulic fluid to be supplied to the pressure accumulator and to the hydraulic motor, respectively, regardless of whether the buoyant body moves up or down as a result of wave movements during operation of the wave energy converter.

This eighth object is achieved by means of a wave energy converter according to claim 8, in which the annular gap-shaped pumping chamber has a cross-sectional area that is between 30 and 70%, preferably about 50%, of the cross-sectional area of the substantially cylindrical pumping chamber.

By designing the cross-sectional areas of the two pumping chambers in such a way, the force is prevented from becoming asymmetrical to such an extent that the average position of the working piston is displaced too far from the central position in the working cylinder, and it is furthermore ensured that the differential cylinder will supply a substantially equal flow of hydraulic fluid regardless of whether the pump piston of the differential cylinder moves up or down, which allows smaller variations in rotational speed and a more stable operation of the hydraulic pump and the generator driven by it.

Further objects and advantages of the invention, and the features enabling these objects and advantages to be achieved, will become evident from the following description.

BRIEF DESCRIPTION OF THE DRAWINGS

In the following, the invention will be described by means of a number of different embodiments with reference to the accompanying drawings, in which.

DESCRIPTION OF EMBODIMENTS OF THE INVENTION

Figure 1:
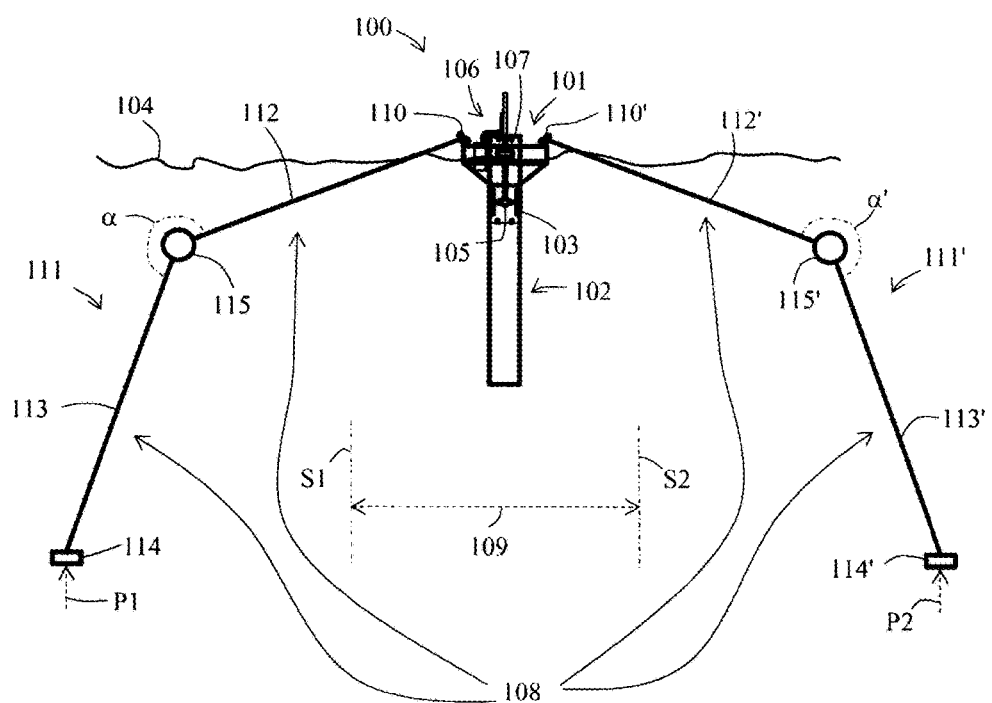
FIG. 1 is a schematic side view, partially in cross-section, of a wave energy converter according to a preferred embodiment of the invention, which is maintained within a desired anchoring area by two pretensioned mooring lines provided with buoyant elements, each being attached to a fastening device on the buoyant body of the wave energy converter and to a dropped anchor, respectively, while the wave energy converter operates as a result of wave movements in a body of water in which the acceleration tube of the wave energy converter is at least partially submerged.

In the following, a number of embodiments of a wave energy converter according to the invention will be described in greater detail with reference to the accompanying FIGS. 1-3.

The wave energy converter 100 comprises a buoyant body 101, which can be of any type and design suitable for the purpose. An acceleration tube 102 is dependent from and attached to the buoyant body 101 and has an upper end adjacent to the buoyant body and a lower end at a distance from the buoyant body, wherein a portion of the acceleration tube 102 defines a working cylinder 103 between the upper end and the lower end. Wave energy converters with acceleration tubes are well known to a skilled person in the field, for example from the patent publications SE 508 307 and SE 508 308. Upper and lower openings in the acceleration tube 102 allow a substantially unimpeded flow of water between the working cylinder 103 and a body of water 104 in which the acceleration tube 102 is at least partially submerged when the wave energy converter operates as a result of wave movements. In the working cylinder 103, there is disposed a working piston 105, which is reciprocable in the working cylinder 103.

The upper and lower openings in the acceleration tube 102 can be provided in different ways depending on the embodiment. In a particularly preferred embodiment of the wave energy converter 100, an upper opening is provided in the form of the open end at the top of the acceleration tube 102, which opens into the atmosphere above the top side of the buoyant body, whereas a lower opening is provided in the form of the open end at the bottom of the acceleration tube 102, which preferably opens approximately 20 meters below the water surface into the body of water in which the acceleration tube 102 is partially submerged. However, it is also conceivable with embodiments of the invention where one or both of the upper and lower openings, respectively, are provided in the form of one or several suitably dimensioned holes disposed through the envelope surface of the acceleration tube at suitable positions.

It is advantageous that the wave energy converter 100 according to the invention further comprises an arrangement for so-called peak force relief to reduce the risk of the working piston 105, the energy collecting device 107 or other components of the wave energy converter 100 being damaged by the forces from excessively large wave movements. As indicated in FIG. 1, such an arrangement can advantageously be provided in that the working cylinder 103 is disposed inside the acceleration tube 102 and designed with a shorter length and smaller outer and inner diameter than the acceleration tube 102 and in that the working piston 105 is designed with an outer diameter fitting inside the inner diameter of the working cylinder 103 and adapted to have a maximum length of stroke that is longer than the length of the working cylinder 103 and shorter than the length of the acceleration tube 102.

In embodiments where the wave energy converter 100 is provided with a suitably designed and dimensioned arrangement for peak force relief as described above, an excessively large wave crest passing the wave energy converter 100 will cause the buoyant body 101 to rise rapidly and simultaneously cause the water column inside the acceleration tube 102 to fall suddenly relative to the buoyant body 101, wherein the falling water column inside the acceleration tube 102 will push the working piston 105 to a lower extreme position outside the working cylinder 103 so that an open passage for the falling water column inside the acceleration tube 102 is formed between the smaller outer diameter of the working piston 105 and the larger inner diameter of the acceleration tube 102 below the working cylinder 103 and is kept open to let water through until the excessively large wave crest has passed. If instead an excessively large wave trough passes the wave energy converter 100, the wave trough will, in an analogous way, cause the buoyant body 101 to fall rapidly and simultaneously cause the water column inside the acceleration tube 102 to rise suddenly relative to the buoyant body 101, wherein the rising water column inside the acceleration tube 102 will push the working piston 105 to an upper extreme position outside the working cylinder 103 so that an open passage for the rising water column inside the acceleration tube 102 is formed between the smaller outer diameter of the working piston 105 and the larger inner diameter of the acceleration tube 102 above the working cylinder 103 and is kept open to let water pass through until the excessively large wave trough has passed.

The wave energy converter 100 further comprises a mooring system 108 adapted to maintain the wave energy converter 100 within a desired anchoring area 109 and comprising at least one fastening device 110; 110' mounted on the buoyant body 101 for attachment of a mooring line 111; 111' to the buoyant body 101. Accordingly, the mooring system of the wave energy converter according to the invention can comprise one or several mooring lines, but preferably comprises at least two mooring lines, out of which at least one, and preferably all, is/are provided with at least one elastic portion or at least one buoyant element, which after pretensioning of the line/lines is capable of keeping it/them taut even when large waves are passing the buoyant body. Similarly, the mooring system of the wave energy converter according to the invention can comprise one or several fastening devices for attachment of the mooring line/lines, but preferably comprises at least two fastening devices, out of which at least one, and preferably all, comprises/comprise a winch or a rotationally fixed winding device mounted on the buoyant body, allowing a very careful and almost slip-free attachment of the upper end of a mooring line to the buoyant body.

The wave energy converter 100 according to the invention further comprises an energy conversion assembly 106 comprising at least one energy collecting device 107 collecting energy from the movements of the working piston 105 relative to the buoyant body 101 resulting from said wave movements.

Figure 2:
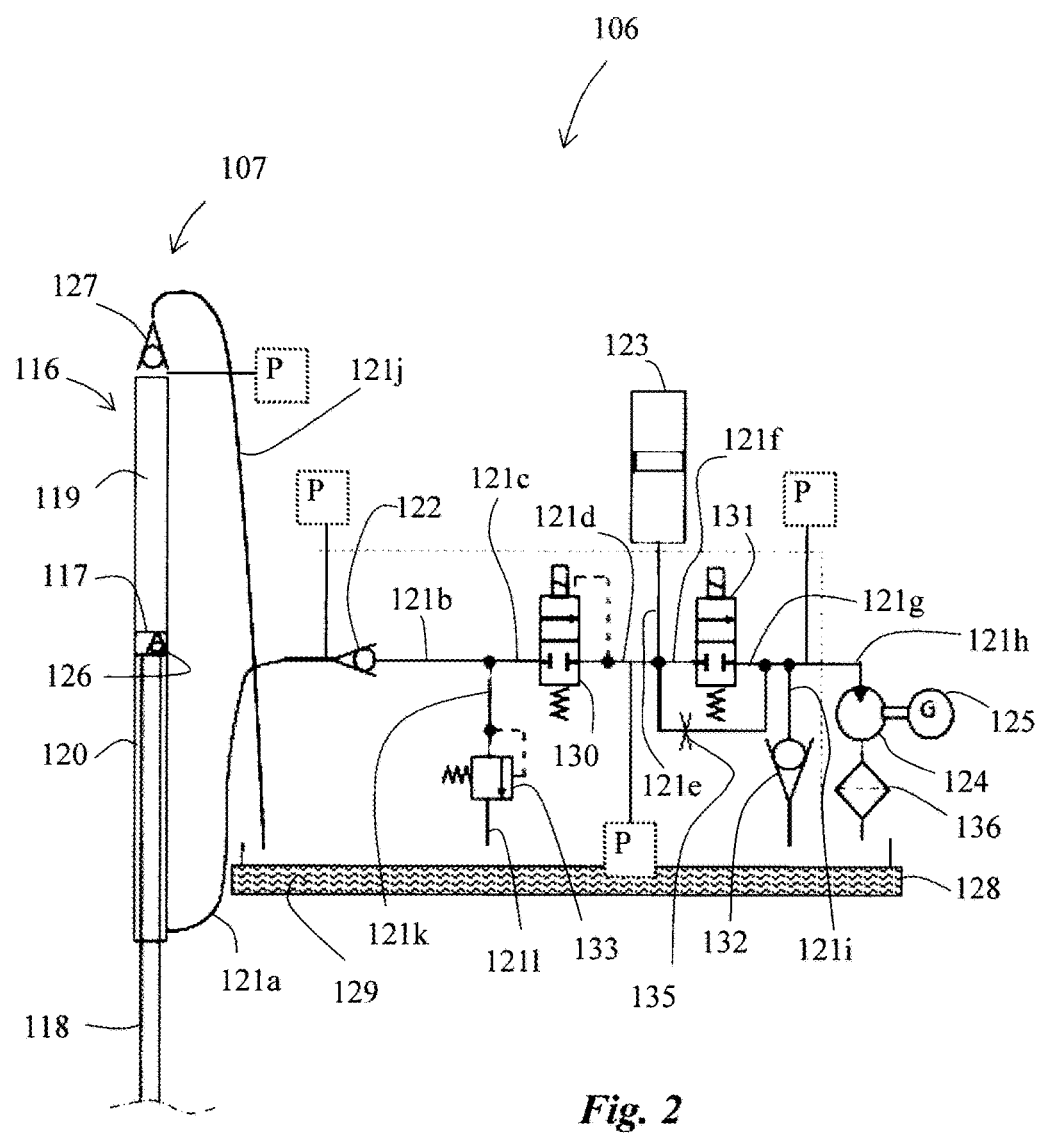
FIG. 2 shows a schematic hydraulic circuit diagram of an energy conversion assembly comprising an energy collecting device including a differential cylinder, according to one embodiment of the invention.
Figure 3:
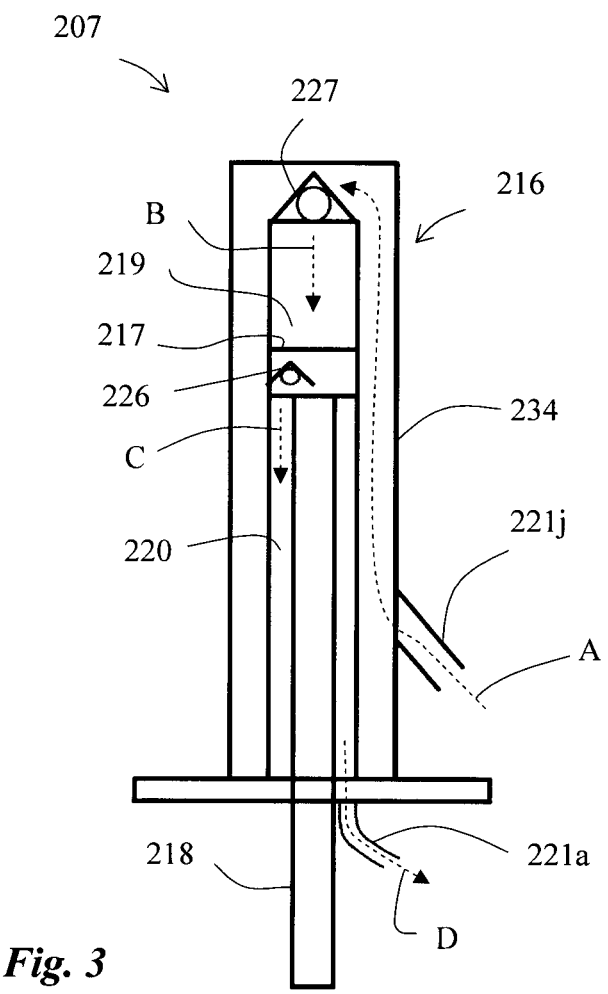
FIG. 3 shows a principal diagram of a differential cylinder of an energy collecting device according to a preferred embodiment of the invention.

The energy collecting device 107 of the wave energy converter according to the invention, illustrated in FIGS. 1-3, includes a hydraulic piston pump in the form of a differential cylinder 116; 216 having an internal pump piston 117; 217, which is connected to the working piston 105 in the acceleration tube 102 via a piston rod 118; 218. The differential cylinder 116; 216 comprises a substantially cylindrical pumping chamber 119; 219 on one side of the pump piston 117; 217 and an annular gap-shaped pumping chamber 120; 220 around the piston rod 118; 218 on the other side of the pump piston 117; 217.

The annular gap-shaped pumping chamber 120; 220 is adapted to be connectable to a hydraulic pressure accumulator 123 via hydraulic fluid conduits 121a, 121b, 121c, 121d, 121e; 221a, which as shown in FIG. 2 can be provided with a one-way valve 122 in certain embodiments, and to then be further connectable, via hydraulic fluid conduits 121f, 121g, 121h, to a hydraulic motor 124 in driving connection with a generator 125 during operation of the wave energy converter 100. Accordingly, the one-way valve 122 shown in FIG. 2 is not necessary in all embodiments of the invention and can then be omitted.

A fluid connection provided with a one-way valve 126; 226 is arranged for connection between the cylinder chambers on each side of the pump piston 117; 217, from the substantially cylindrical pumping chamber 119; 219 to the annular gap-shaped pumping chamber 120; 220. In a preferred embodiment of the invention, the one-way valve 126; 226 of the fluid connection bypassing the pump piston of the differential cylinder 116; 216 is arranged in the pump piston 117; 217 itself. Such a design is simple and reliable in operation and contributes to minimizing the weight of the energy collecting device.

A fluid conduit 121j; 221j provided with a one-way valve 127; 227 is arranged from a fluid tank 128 to the substantially cylindrical pumping chamber 119; 219. In a particularly preferred embodiment of the invention, illustrated in FIG. 2, a portion of the fluid conduit 221j connecting the fluid tank to the substantially cylindrical pumping chamber 219 is constituted by a hollow jacket 234 of the differential cylinder 216. This embodiment is advantageous since a portion of the conduit 121j between the fluid tank and the cylindrical pumping chamber shown in the embodiment in FIG. 1 can be replaced by the hollowly designed cylinder jacket 234 in FIG. 2, which further reduces the total weight of the energy conversion assembly 106.

During operation of the wave energy converter 100 according to the invention, the pump piston 117; 217 will expel hydraulic fluid D from the annular gap-shaped pumping chamber 120; 220 into the fluid conduits 121a, 121b, 121c, 121d, 121e; 221a in a direction toward the pressure accumulator 123 and simultaneously draw hydraulic fluid A, via the fluid conduit 121j; 221j from the fluid tank 128, into the substantially cylindrical pumping chamber 119; 219, during a working stroke causing a decrease in volume of the annular gap-shaped pumping chamber 120; 220. During a working stroke in the opposite direction, causing a decrease in volume of the substantially cylindrical pumping chamber 119; 219, the pump piston 117; 217 will instead cause hydraulic fluid C to bypass the pump piston 117; 217 through the fluid connection provided with the one-way valve 126; 226 from the substantially cylindrical pumping chamber 119; 219 into the annular gap-shaped pumping chamber 120; 220 and further in a direction toward the pressure accumulator 123 via the fluid conduits 121a, 121b, 121c, 121d, 121e; 221a.

Thanks to the provision of an energy collecting device in the form of a differential cylinder without any through-going piston rod as described in the foregoing, the same pumping action as in the hydraulic piston pumps utilized in the previously used wave energy converters can be achieved, but in principle with a reduction to half of both the maximum external dimension, i.e. the length, of the energy collecting device and the weight thereof. This means that the energy collecting device of the wave energy converter according to the invention gets a considerably lower weight and a smaller maximum external dimension than the previously utilized energy collecting devices, which in its turn allows the energy conversion assembly of the wave energy converter according to the invention to be given a lower total weight and be designed less bulky, so that the buoyant body gets a more favourable weight distribution making it more stable and so that the buoyant body furthermore will exhibit a smaller area exposed to the wind beyond its outer contour. In this way, both placement and maintenance of the wave energy converter can be facilitated and the risk of operational problems or breakdowns in strong winds can be reduced.

In one advantageous embodiment of the wave energy converter according to the invention, the hydraulic fluid conduits 121a, 121b, 121c, 121d, 121e connecting the annular gap-shaped pumping chamber 120 to the pressure accumulator 123 are provided with at least one stop valve 130. The stop valve makes it possible to operate the pump piston of the differential cylinder to a desired position in the pumping chambers and to fix the pump piston in this position by operating the stop valve, which can facilitate for maintenance and service.

In another advantageous embodiment, the hydraulic fluid conduits 121f, 121g, 121h connecting the hydraulic motor 124 to the pressure accumulator 123 and to the annular gap-shaped pumping chamber 120, respectively, are provided with at least one speed limiting valve 131. The speed limiting valve is adapted to close the direct fluid connection to the hydraulic motor when detecting a risk of excessively high rotational speeds via sensors (not shown) and to thereby bypass the hydraulic fluid through a pressure reducing means 135 in the form of a constriction (see FIG. 2), which minimizes the risk of dangerously high rotational speeds of the motor and/or generator occurring.

In yet another advantageous embodiment, a fluid conduit 121*i* provided with a one-way valve 132 is arranged between the fluid tank 128 and the fluid conduit 121*h* upstream of the hydraulic motor 124. The fluid conduit with a one-way valve between the fluid tank and the fluid conduit upstream of the hydraulic motor is adapted to allow the hydraulic motor, while it is still free-spinning at a high rotational speed as a result of a preceding wave movement, to draw hydraulic flow directly from the fluid tank if the supply of hydraulic fluid from the differential cylinder and the pressure accumulator becomes temporarily insufficient.

In another advantageous embodiment of the wave energy converter according to the invention, fluid conduits 121*k*, 121*l* provided with a safety valve 133, actuated by excessive pressure in the hydraulic fluid, are arranged so as to provide a connection between the fluid conduits 121*b* running in a direction toward the pressure accumulator 123 and the fluid tank 128 when the safety valve 123 is actuated, for relieving the excessive pressure. The safety valve is adapted to be actuated when detecting an excessively high pressure via pressure sensors P and to release hydraulic fluid to the fluid tank, which minimizes the risk of damages to components in the system due to excessively high pressures caused by, for example, an unusually big wave passing the buoyant body of the wave energy converter.

In a preferred embodiment of the wave energy converter according to the invention, the annular gap-shaped pumping chamber 120; 220 has a cross-sectional area that is between 30 and 70%, preferably about 50%, of the cross-sectional area of the substantially cylindrical pumping chamber 119; 219. Through such a design, the force is prevented from becoming asymmetrical to such an extent that the average position of the working piston 105 is displaced too far from the central position in the working cylinder 103, and it is furthermore ensured that the differential cylinder 116 will supply a substantially equal flow of hydraulic fluid regardless of whether the pump piston of the differential cylinder moves up or down as a result of wave movements acting on the buoyant body, which allows smaller variations in rotational speed and a more stable operation of the hydraulic pump and the generator driven by it.

As has in part become apparent from the foregoing and is shown in FIG. 2, the energy conversion assembly 106 of the wave energy converter according to the invention also comprises a number of necessary pressure sensors P and at least one rotational speed sensor (not shown), and preferably also a filter unit 136 for filtering the hydraulic fluid in the system.

In the foregoing, the present invention has been described with the aid of a number of different embodiments and with reference to the accompanying drawings. It should be understood, however, that the invention is not limited to the described embodiments and to what is shown in drawings, but that also other embodiments are conceivable within the scope of the invention as it is defined by the following claims.

The invention claimed is:
1. A wave energy converter (100), comprising a buoyant body (101), an acceleration tube (102) dependent from and attached to the buoyant body (101) and having an upper end adjacent to the buoyant body and a lower end at a distance from the buoyant body, wherein a portion of the acceleration tube (102) defines a working cylinder (103) between the upper end and the lower end, upper and lower openings in the acceleration tube (102) for allowing a substantially unimpeded flow of water between the working cylinder (103) and a body of water (104) in which the acceleration tube (102) is at least partially submerged when the wave energy converter operates as a result of wave movements, a working piston (105) reciprocable in the working cylinder (103), a mooring system (108) adapted to maintain the wave energy converter (100) within a desired anchoring area (109) and comprising at least one fastening device (110; 110') mounted on the buoyant body (101) for attachment of a mooring line (111; 111') to the buoyant body (101), and an energy conversion assembly (106) comprising at least one energy collecting device (107) collecting energy from the movements of the working piston (105) relative to the buoyant body (101) resulting from said wave movements, wherein the energy collecting device (107) includes a hydraulic piston pump in the form of a differential cylinder (116; 216) having an internal pump piston (117; 217), which is connected to the working piston (105) in the acceleration tube (102) via a piston rod (118; 218), wherein the differential cylinder (116; 216) comprises a substantially cylindrical pumping chamber (119; 219) on one side of the pump piston (117; 217) and an annular gap-shaped pumping chamber (120; 220) around the piston rod (118; 218) on the other side of the pump piston (117; 217), that the annular gap-shaped pumping chamber (120; 220) is adapted to be connectable, via hydraulic fluid conduits (121*a*, 121*b*, 121*c*, 121*d*, 121 *e*; 221*a*), to a hydraulic pressure accumulator (123), and to then be further connectable, via hydraulic fluid conduits (121*f*, 121*g*, 121 *h*), to a hydraulic motor (124) in driving connection with a generator (125) during operation of the wave energy converter (100), that a fluid connection provided with a one-way valve (126; 226) is arranged for connection between the cylinder chambers on each side of the pump piston (117; 217), from the substantially cylindrical pumping chamber (119; 219) to the annular gap-shaped pumping chamber (120; 220), that a fluid conduit (121*j*; 221*j*) provided with a one-way valve (127; 227) is arranged from a fluid tank (128) to the substantially cylindrical pumping chamber (119; 219), so that, during operation of the wave energy converter (100), the pump piston (117; 217) will expel hydraulic fluid (D) from the annular gap-shaped pumping chamber (120) into the fluid conduits (121*a*, 121*b*, 121*c*, 121*d*, 121*e*; 221*a*) in a direction toward the pressure accumulator (123) and simultaneously draw hydraulic fluid (A), via the fluid conduit (121*j*; 221*j*) from the fluid tank (128), into the substantially cylindrical pumping chamber (119; 219), during a working stroke causing a decrease in volume of the annular gap-shaped pumping chamber (120; 220), and so that the pump piston (117; 217), during a working stroke causing a decrease in volume of the substantially cylindrical pumping chamber (119; 219), will cause hydraulic fluid (C) to bypass the pump piston (117; 217) through the fluid connection provided with the one-way valve (126; 226), from the substantially cylindrical pumping chamber (119; 219) into the annular gap-shaped pumping chamber (120; 220) and further in a direction toward the pressure accumulator (123) via the fluid conduits (121a, 121b, 121c, 121d, 121e; 221a).

2. The wave energy converter according to claim 1, wherein
the one-way valve (126; 226) of the fluid connection bypassing the pump piston of the differential cylinder (116; 216) is arranged in the pump piston (117; 217) itself.

3. The wave energy converter according to claim 1, wherein
the hydraulic fluid conduits (121a, 121b, 121c, 121d, 121e) connecting the annular gap-shaped pumping chamber (120) to the pressure accumulator (123) are provided with at least one stop valve (130).

4. The wave energy converter according to claim 1, wherein
the hydraulic fluid conduits (121f, 121g, 121h) connecting the hydraulic motor (124) to the pressure accumulator (123) and to the annular gap-shaped pumping chamber (120), respectively, are provided with at least one speed limiting valve (131), which minimizes the risk of dangerously high rotational speeds of the motor and/or generator occurring in that the valve (131) is adapted to close the direct fluid connection to the hydraulic motor when detecting a risk of excessively high rotational speeds and to thereby bypass the hydraulic fluid to the hydraulic motor through a constriction (135) disposed in the hydraulic fluid conduits.

5. The wave energy converter according to claim 1, wherein
a fluid conduit (121i) provided with a one-way valve (132) is arranged between the fluid tank (128) and the fluid conduit (121h) upstream of the hydraulic motor (124).

6. The wave energy converter according to claim 1, wherein
fluid conduits (121k, 121l), provided with a safety valve (133) actuated by excessive pressure in the hydraulic fluid, are arranged so as to provide a connection between the fluid conduits (121b running in a direction toward the pressure accumulator (123) and the fluid tank (128) when the safety valve (133) is actuated, for relieving the excessive pressure.

7. The wave energy converter according to claim 1, wherein
a portion of the fluid conduit (221j) connecting the fluid tank to the substantially cylindrical pumping chamber (219) is constituted by a hollow jacket (234) of the differential cylinder (216).

8. The wave energy converter according to claim 1, wherein
the annular gap-shaped pumping chamber (120; 220) has a cross-sectional area that is between 30 and 70 of the cross-sectional area of the substantially cylindrical pumping chamber (119; 219).

9. The wave energy converter according to claim 2, wherein
the hydraulic fluid conduits (121a, 121b, 121c, 121d, 121e) connecting the annular gap-shaped pumping chamber (120) to the pressure accumulator (123) are provided with at least one stop valve (130).

10. The wave energy converter according to claim 2, wherein
the hydraulic fluid conduits (121f, 121g, 121h) connecting the hydraulic motor (124) to the pressure accumulator (123) and to the annular gap-shaped pumping chamber (120), respectively, are provided with at least one speed limiting valve (131), which minimizes the risk of dangerously high rotational speeds of the motor and/or generator occurring in that the valve (131) is adapted to close the direct fluid connection to the hydraulic motor when detecting a risk of excessively high rotational speeds and to thereby bypass the hydraulic fluid to the hydraulic motor through a constriction (135) disposed in the hydraulic fluid conduits.

11. The wave energy converter according to claim 3, wherein
the hydraulic fluid conduits (121f, 121g, 121h) connecting the hydraulic motor (124) to the pressure accumulator (123) and to the annular gap-shaped pumping chamber (120), respectively, are provided with at least one speed limiting valve (131), which minimizes the risk of dangerously high rotational speeds of the motor and/or generator occurring in that the valve (131) is adapted to close the direct fluid connection to the hydraulic motor when detecting a risk of excessively high rotational speeds and to thereby bypass the hydraulic fluid to the hydraulic motor through a constriction (135) disposed in the hydraulic fluid conduits.

12. The wave energy converter according to claim 2, wherein
a fluid conduit (121i) provided with a one-way valve (132) is arranged between the fluid tank (128) and the fluid conduit (121h) upstream of the hydraulic motor (124).

13. The wave energy converter according to claim 3, wherein
a fluid conduit (121i) provided with a one-way valve (132) is arranged between the fluid tank (128) and the fluid conduit (121h) upstream of the hydraulic motor (124).

14. The wave energy converter according to claim 4, wherein
a fluid conduit (121i) provided with a one-way valve (132) is arranged between the fluid tank (128) and the fluid conduit (121h) upstream of the hydraulic motor (124).

15. The wave energy converter according to claim 2, wherein
fluid conduits (121k, 121l), provided with a safety valve (133) actuated by excessive pressure in the hydraulic fluid, are arranged so as to provide a connection between the fluid conduits (121b) running in a direction toward the pressure accumulator (123) and the fluid tank (128) when the safety valve (133) is actuated, for relieving the excessive pressure.

16. The wave energy converter according to claim 3, wherein
fluid conduits (121k, 121l), provided with a safety valve (133) actuated by excessive pressure in the hydraulic fluid, are arranged so as to provide a connection between the fluid conduits (121b) running in a direction toward the pressure accumulator (123) and the fluid tank (128) when the safety valve (133) is actuated, for relieving the excessive pressure.

17. The wave energy converter according to claim 4, wherein
fluid conduits (121k, 121l), provided with a safety valve (133) actuated by excessive pressure in the hydraulic fluid, are arranged so as to provide a connection between the fluid conduits (121*b*) running in a direction toward the pressure accumulator (123) and the fluid tank (128) when the safety valve (133) is actuated, for relieving the excessive pressure.

18. The wave energy converter according to claim 5, wherein fluid conduits (121*k*, 121*l*), provided with a safety valve (133) actuated by excessive pressure in the hydraulic fluid, are arranged so as to provide a connection between the fluid conduits (121*b*) running in a direction toward the pressure accumulator (123) and the fluid tank (128) when the safety valve (133) is actuated, for relieving the excessive pressure.

19. The wave energy converter according to claim 2, wherein a portion of the fluid conduit (221*j*) connecting the fluid tank to the substantially cylindrical pumping chamber (219) is constituted by a hollow jacket (234) of the differential cylinder (216).

20. The wave energy converter according to claim 8, wherein the annular gap-shaped pumping chamber (120; 220) has a cross-sectional area that is about 50 %, of the cross-sectional area of the substantially cylindrical pumping chamber (119; 219).

* * * * *